(12) United States Patent
Graab et al.

(10) Patent No.: US 6,503,424 B2
(45) Date of Patent: Jan. 7, 2003

(54) MULTICOLORED PATTERNED FLOOR COVERING AND METHOD FOR MANUFACTURE

(75) Inventors: Gerhard Graab, Mannheim (DE);
Klaus Heckel, Gorxheimertal (DE);
Dieter Rischer, Abtsteinach (DE);
Thorsten Nahe, Birkenheide (DE);
Helmut Grünhag, Hemsbach (DE)

(73) Assignee: Firma Carl Freudenberg, Weinheim (DE)

( * ) Notice: Subject to any disclaimer, the term of this patent is extended or adjusted under 35 U.S.C. 154(b) by 0 days.

(21) Appl. No.: 09/774,903

(22) Filed: Jan. 31, 2001

(65) Prior Publication Data

US 2001/0005542 A1 Jun. 28, 2001

Related U.S. Application Data

(62) Division of application No. 08/390,175, filed on Feb. 17, 1995, now Pat. No. 6,221,462.

(30) Foreign Application Priority Data

Feb. 22, 1994 (DE) .......................................... 44 05 589

(51) Int. Cl.$^7$ ................................................ B29B 17/00
(52) U.S. Cl. ................................. 264/37.29; 264/37.28; 264/37.3; 264/74; 264/76; 264/73; 264/112; 264/124; 264/126; 264/175; 264/24.5; 427/194; 427/195; 427/189
(58) Field of Search .......................... 264/37.29, 37.28, 264/37.3, 74, 76, 73, 112, 124, 126, 175, 245; 427/194, 195, 189

(56) References Cited

U.S. PATENT DOCUMENTS

| 3,040,210 A | | 6/1962 | Charlton et al. ............. 361/212 |
|---|---|---|---|
| 4,076,567 A | * | 2/1978 | Yoshikawa et al. .......... 156/219 |
| 4,239,797 A | | 12/1980 | Sachs .......................... 428/327 |
| 4,574,065 A | * | 3/1986 | Appleyard et al. ............. 264/76 |
| 4,784,911 A | | 11/1988 | Gembinski et al. .......... 428/402 |
| 4,923,658 A | * | 5/1990 | Hover et al. .................... 264/76 |
| 5,154,868 A | | 10/1992 | Heckel et al. ............... 264/162 |
| 5,244,942 A | | 9/1993 | Hover et al. ............... 5239/171 |

FOREIGN PATENT DOCUMENTS

| CA | 2103990 A | * | 2/1994 |
|---|---|---|---|
| DE | 0582770 A1 | * | 2/1994 |
| FR | 1 167 760 | | 11/1958 |
| JP | 2-269258 A1 | * | 11/1990 |

* cited by examiner

*Primary Examiner*—William P. Watkins, III
(74) *Attorney, Agent, or Firm*—Kenyon & Kenyon

(57) ABSTRACT

A multicolored, patterned floor covering is disclosed along with a method for its manufacture. The floor covering is made of a sheeting which has a first color, and a granular material dyed differently from the sheeting which is embedded in the sheeting along at least in the area of the top side. The sheeting and the granular material consist of cross-linkable, elastomeric materials, the granular material comprising particles which have at least two subregions dyed differently from each other and from the sheeting. The quantity and color of the fractions of each component as selected so that the mixed color resulting from an homogeneous intermixing of all the components contained in the floor covering agrees with the first color.

4 Claims, 3 Drawing Sheets

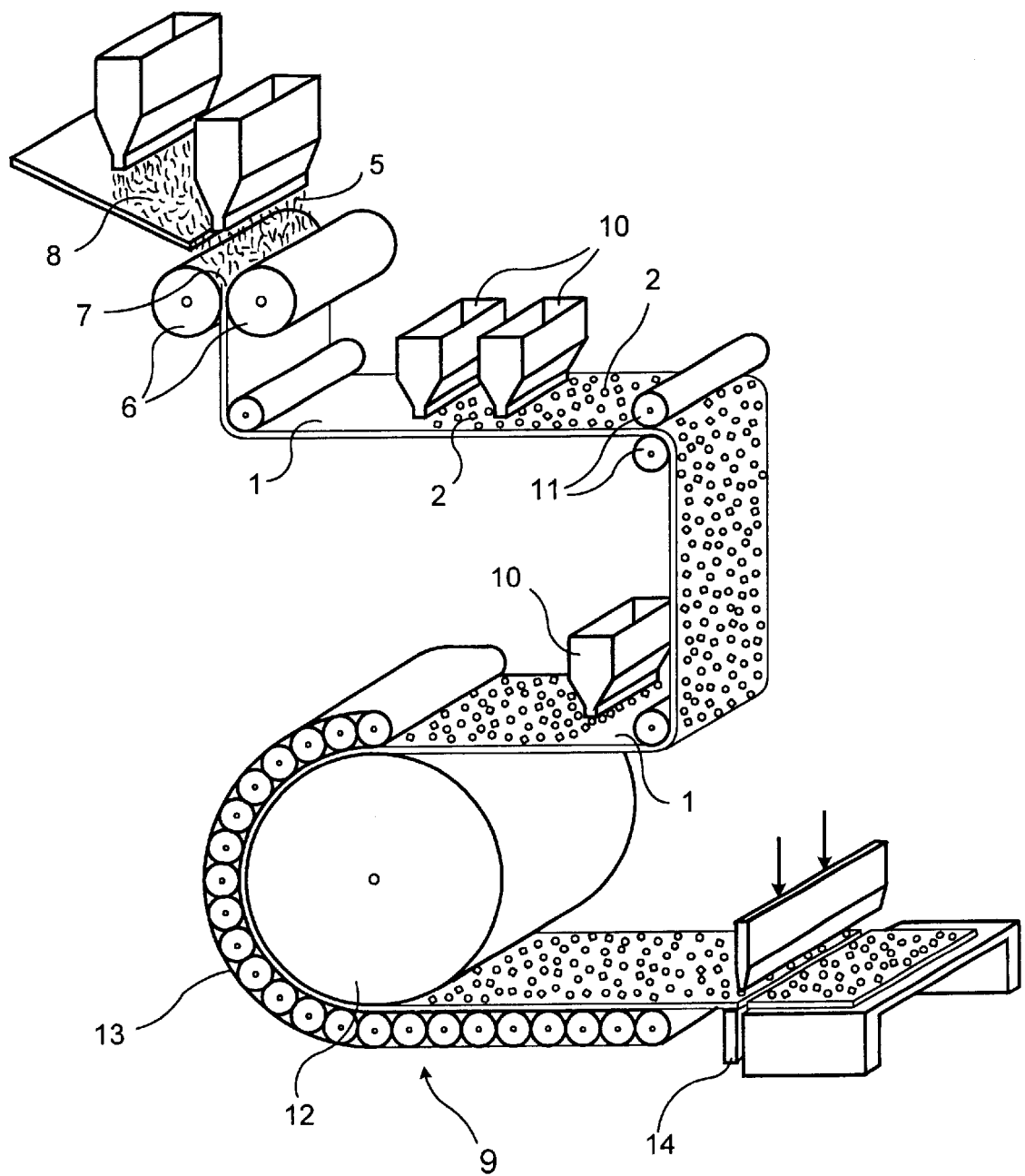
F I G. 3

MULTICOLORED PATTERNED FLOOR COVERING AND METHOD FOR MANUFACTURE

CROSS-REFERENCE TO RELATED APPLICATION

This application is a division of U.S. Ser. No. 08/390,175, filed Feb. 17, 1995 now U.S. Pat. No. 6,221,462.

BACKGROUND OF THE INVENTION

The invention relates generally to a multicolored, patterned floor covering and a method for its manufacture. The floor covering is of the type which typically has a thickness of 1 to 4 mm, and consists of a sheeting having a first color that contains an imbedded granulated material dyed to a second color that differs from the color of the sheeting. The granulated material is embedded in the sheeting in at least the upper side of the sheeting. Such a floor covering is disclosed in French patent FR-PS 11 67 760, which lists a number of thermoplastic, polymer materials usable for this purpose, with polyvinyl chloride (PVC) being preferred.

The French patent also describes a method for manufacturing such a floor covering, particularly from PVC, in which at least two differently colored fractions of raw material are converted into sheeting using two rollers having identical diameters turning inversely at the same speed. Concomitantly, granular materials are forced under pressure into a thermoplastic base material, which is then heated to at least the softening point of the base material and again pressed, so that the base material completely surrounds the particles.

One problem arising from the manufacture of such floor coverings is that the pieces of waste material such as border trimmings and production remnants that are produced by such methods are characterized by the respective colors that are utilized. Consequently, they are not reusable in the same production process, and are usable to only a limited extent for the production of other recycled products.

This invention is directed to the problem of providing a floor covering of this general type, and a method for its production, such that the pieces of waste material that are produced through the manufacture of the floor covering can be reused in the same process.

SUMMARY OF THE INVENTION

The invention solves this problem by providing a patterned floor covering having a thickness of 1 to 4 mm, in which sheeting comprises a matrix having a first color and to which a quantity of contrastingly colored particles is added. Both the matrix sheeting material and the contrastingly colored particles are made of cross-linkable elastomeric materials. The contrastingly colored particles have a plurality of dissimilarly colored sections that also differ in appearance from the matrix material. The amount and color of the particles and the sections within the particles are so selected and harmonized with respect to the quantity and color of the material forming the sheet matrix that the overall mixed color effect from intermixing the components is itself consistent with respect to the matrix color. In other words, while the added particles may, individually, contrast with respect to the surface of the matrix sheeting material in which they are imbedded, they are provided in overall quantities and color such that when remnants of the finished sheeting containing the added particles are reduced to particulate material, they can be recycled into matrix material for use as additional sheeting. The coloration of the imbedded particles and their quantity is not so great as to contrast unduly with the virgin matrix sheeting material with which the process is begun.

It is to be understood that the recycled material will agree in coloration with the virgin matrix material in the general sense, and that the latter may be combined with the former or used alone as matrix even though it may not be exactly identical in appearance to the virgin matrix material, and even though slight color variations between the mixed color and the first color may be detectable optically or by using measuring technology. This does not constitute an obstacle to the practical utilization of this material in recycling within the process. This is especially true when one considers that in a typical large-scale industrial process, the recycled remnants that are used may constitute merely a fraction of the total quantity of matrix material employed to produced new sheeting.

By utilizing elastomeric materials for all of the components of the covering, the floor covering obtained possesses excellent mechanical properties. Moreover, these properties are easy to control, as the matrix material which forms the sheeting is of homogenous composition, and completely surrounds the particles embedded therein (with the exception of the particle surfaces which face the working surface of the floor covering). In addition, by eliminating the production of unrecyclable waste material, the floor covering can be manufactured in a particularly cost-effective manner.

The particles that are added to the matrix can comprise at least three zones varying in coloration from the adjoining zones of the particle. This permits one to vary the appearance of the floor covering to a great extent to suit a wide array of tastes.

The particles can be arranged so close to one another that they touch. In this embodiment, the outer appearance of the floor covering is determined substantially by the structure and dying of the particles.

However, it is also possible to arrange the particles so that they are spaced apart from each other. In this embodiment, the outer appearance of the floor covering is determined substantially by the color of the sheeting, with the particles serving to provide the effect of "breaking up" the appearance of the sheeting.

The particles can be distributed in a randomized pattern or in an arbitrarily selected ordered pattern. For example, the particles may be distributed in the sheets to present the form of letters, words, or pictographs.

Such detailed distribution of particles requires that one be able to precisely distribute the particles into the matrix forming the sheet. This is best done by limiting the distribution of particles so that they are embedded only in the top side and/or in the bottom side of the sheeting. In such a variant, it is advantageous that the quantity of particles embedded in the top side of the sheeting be greater that the quantity of particles embedded in the bottom side. The discrete color surfaces visible in the area of the top side should have a size of between 1 to 25 $mm^2$, it being preferable that the contrastingly-colored particles and particle sections be present in a quantity of between 80 to 450 $g/m^2$, relative to the weight of the material body forming the sheeting.

The method set forth in FR-PS 11 67 760 is not well suited to the manufacture of a floor covering that, like the floor covering of the present invention, is made of rubber. Accordingly, a further goal of the invention is to further develop the known method so that to permit the manufacture of a floor covering made of rubber.

In the method of the invention, a contrastingly-colored granular material made of caoutchouc is introduced into a sheeting of caoutchouc that has previously been homogeneously dyed to a first color. The granular material comprises particles which include at least two particle sections dyed differently both from each other and from the sheeting and which are permanently set in position by means of subsequent vulcanization into the sheeting. In its final, ready-to-use state, the floor covering is no longer capable of being thermally softened, and possesses great chemical, mechanical and thermal stability. The sheeting is harmonized with respect to the quantity and color of the caoutchouc of which it is formed with respect to both the quantity and the color of the particles and particle sections contained in the granular material. This is done so that the mixed or composite color effect resulting from the homogenous intermixing of all the components added to the floor covering agrees with the color of the original sheet matrix, thereby facilitating the use of sheet remnants in recycled form. Hence, the floor covering can be produced cost-effectively while avoiding the production of any waste material.

In accordance with one advantageous refinement, the sheet or matrix is formed from a feed of a first granular rubber material having a first color that is fed directly from above into a gap between two horizontally counter-rotating rollers. This material is also mixed with a contrastingly-colored second granular material. The bulk material thus obtained is compressed in the opening or nip of the rollers in a non-porous manner while avoiding a mutual intermixing of the color boundaries of the particles forming the granular materials. At the same time, the second granular material preferentially is fed to the first granular material at a site that is displaced relative to the middle of the opening, towards or away from one or the other rollers. This minimizes its exposure to the considerable shear forces which arise in the middle of the opening. The production of precisely patterned floor covering which the invention affords and its lack of blurred colors follows from this aspect of the invention.

In another aspect of the invention, a contrastingly-colored granular material made of caoutchouc is sprinkled on a sheeting of caoutchouc dyed in a first color. The granular material comprises particles having particle sections which are dyed differently from the sheeting, the sheeting and the granular material being so harmonized with each other with respect to quantity and color that the mixed color resulting from an homogeneously mixing all of the components contained in the floor covering (as would happen should one reduce any scrape so produced back into particle form) agrees with the first color. In a subsequent step, the particles are pressed into the sheeting so that they are flush with the surface. This is accomplished by means of a roll calendar, a continuous vulcanizing machine or a press at a temperature of 160° C. to 190° C., in which the position of the added granular material is fixed with respect to the sheet of matrix material by the subsequent vulcanization of the caoutchouc. The mechanical stress of the contrastingly-colored particles and particle sections is particularly insignificant in the case of such a method, which facilitates the production the production of patterns which are free from blurred colors in the visible surface portions of the floor covering.

All elastomeric materials which are suitable for the manufacture of floor covering, such as, SBR (styrene butadience rubber), NBR (nitrile-butadiene rubber), EPDM (a terpolymer elastomer made from ethylene-propylene diene monomer) or natural rubber, as well as mixtures of these, can be used within in the present invention.

The colored granular material that is employed to provide contrast with the color of the sheeting can be obtained by producing contrastingly-colored rubber mixtures independently of each other, converting them into the form of strands using extruders, and subsequently granulating them. The variously colored fractions of the individual granular substances are then combined according to quantity and color and allocated in the sheeting that has been dyed in the first color so that, in an homogeneous intermixing of all the components, the color of the sheeting again results. Of course, such an intermixing or homogenization is only undertaken if, in the manufacture of the floor covering, waste products remain which should be fed once more into the production process.

It is also within the scope of this invention to use a single extruder to jointly convert the contrastingly-colored rubber mixtures, produced independently of each other, into the form of varicolored strands and subsequently to granulate these and sprinkle them on the sheeting that has been dyed to a first color in such a quantity and color distribution of the fractions that the mixed color resulting from an homogenous intermixing of all the components contained in the product agrees with the first color. With regard to the manufacture of multicolored particles of this kind, it is merely important that contrastingly-colored rubber mixtures utilized for their manufacture be prevented from mutual intermixing in the area of the color boundaries during the processing in the extruder. This can be achieved by mixing in an extruder under particularly careful conditions. With this caveat in mind, it should be particularly noted that temperatures of more than 100° C. should be avoided, as should other stresses which can lead to a complete decomposition of the rubber mixtures used.

The method according to the invention allows the contrastingly-colored granular materials to be particularly well integrated into the material body forming the sheeting, so that in the mandrel bending test according to DIN 51949, using a mandrel having a diameter of 20 mm and a material thickness of the sheeting of 2 mm, no separation is to be observed at the grain boundary between the particles embedded in the sheeting and the base (matrix) material. The particles, vulcanized into the sheeting in a manner that they are flush with the surface, form with the surface of the sheeting a single gap-free surface.

The waste resulting from the production of the floor covering according to the invention can be reused in any quantity as needed in manufacturing a floor covering which completely agrees with the floor covering manufactured initially. Hence, the economies of this process are very advantageous.

BRIEF DESCRIPTION OF THE DRAWINGS

For a more complete understanding of this invention, reference should now be made to the embodiments illustrated in greater detail in the accompanying drawings and described below. In the drawings:

FIG. 3 is a schematic illustration of the manufacture of a floor covering of the type set forth in the invention;

DETAILED DESCRIPTION

Figure 1:
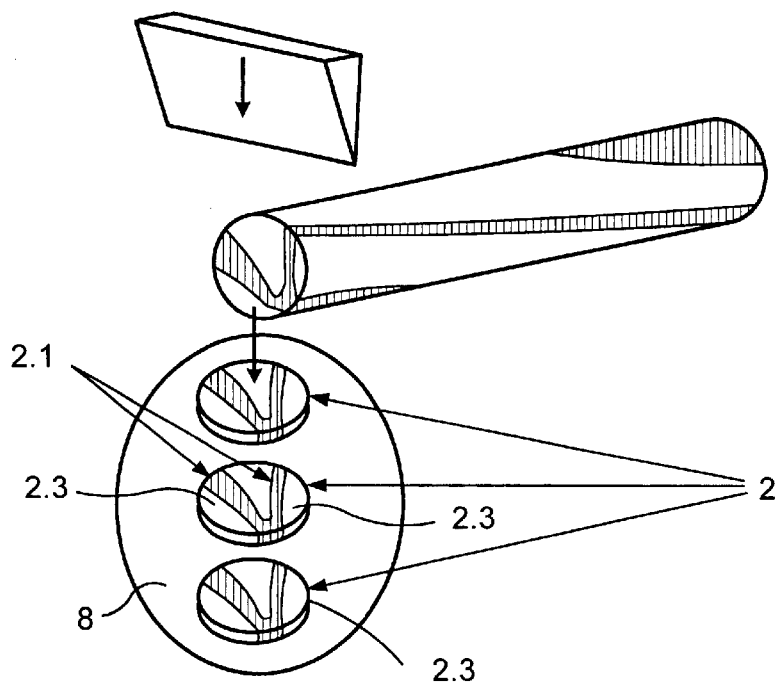
FIG. 1 schematically illustrates the manufacture of particles which have contrastingly-colored particle sections.
Figure 2:
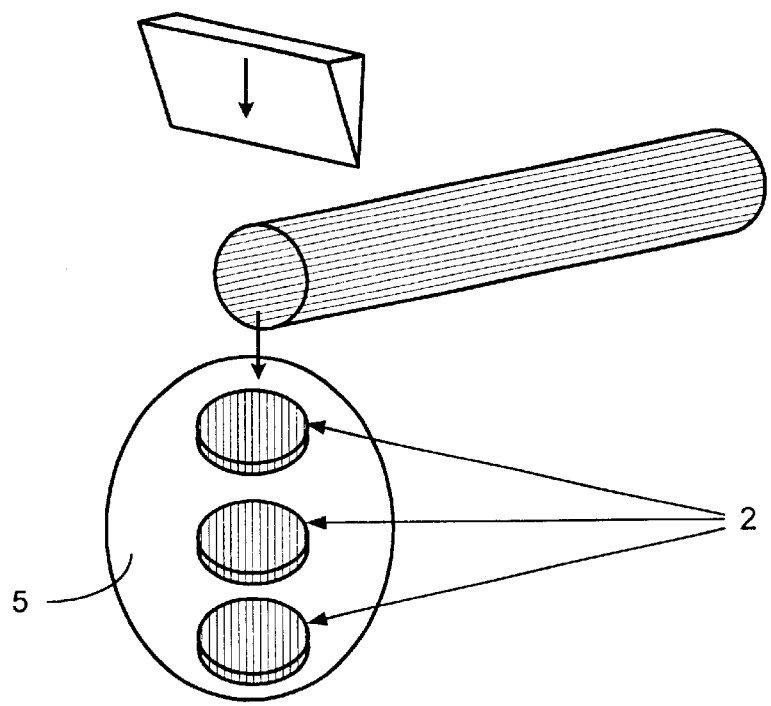
FIG. 2 schematically illustrates the manufacture of particles which are homogeneously dyed.

Referring now to the drawings, wherein like numerals indicate like parts throughout, FIGS. 1 and 2 illustrate the manufacture of granular materials which can be used in the manufacture of the floor covering of the invention. Selectively dyed caoutchouc mixtures are employed in the manufacture process. These caoutchouc mixtures may consist of natural and/or synthetic starting products and are produced using mixing devices as is customary in the rubber industry, e.g., kneaders, rolling mills and/or extruders. In the output stage, the respective caoutchouc mixtures employed are converted into the form of cylindrical bodies from which short sections are successively cut off. There sections, in their entirety, form a granular material.

The granular materials may contain contrastingly-colored particle sections of sub-regions 2.1 and 2.3, as shown in FIG. 1. These sections can be obtained by using an extruder to carefully convert a plurality of contrastingly-colored caoutchouc strands into the form of a columnar body, as shown in FIG. 1. This is preferably achieved by reducing the frictional forces active in the extruder to the extent necessary to avoid any intermixing of the separate color components contained in the strands. The progress of this step can readily be controlled by examining the appearance of the outer surface of the columnar body. So long as the exterior surface of the columnar body appears to be non-porous and has a clearly structured pattern free of any blurring of the coloration, one may assume that a precisely structured pattern is also present in the interior of the columnar body.

The body can have a circularly bounded profile, as shown in FIGS. 1 and 2. However, as needed, the body can also be provided with another profile, e.g., a spline profile, or a profile which combines within itself both flat as well as rounded peripheral areas.

FIG. 1 illustrates the manufacture of the granular material 8. This material is seen to contain subregions 2, which may be made of contrastingly-colored particle sections 2.1 and 2.3. FIG. 2 illustrates the manufacture of a granular material 5 in which the individual particles are homogeneously dyed and have the same color.

The manner in which these particles are utilized to form the desired floor covering is schematically shown in FIG. 3. At the beginning of the process, a calendar is provided which has two counter-rotating calendar rollers 6, which turn about horizontal axes. The matrix of the floor covering is formed by a granular material 5 that has been homogeneously dyed to a first color. This granular material 5 is fed from a feeder located directly above the central nip of the calender rollers 6 so that it falls into the space between the two rollers 6. It is this granular material 5 which forms the matrix of the sheets that are subsequently formed.

The second granular material 8 is sprinkled into the rollers from a second location displaced from the front or back of the rollers. It is the distribution of this second granular material which produces a pattern along the upper surface of the floor covering. The second granular material 8 comprises particles preferably having at least two particle sections, similar to the type shown in FIG. 1, contrasting in color with respect to the first granular material 5. This granular material can also comprise particles that re dyed to be of a uniform color that is different from the color of the particles of the first granular material 5. Additional contrastingly-colored granular materials may be fed from above the rollers from a site that is similarly displaced from the central nip of the rollers in the opposite direction.

In the space between the rollers, the aggregate of all of the granular material fed from above is converted into a non-porous sheeting. The contrastingly-colored granular material 8 that has previously been fed to the incoming stream of granular materials from a location displaced relative to the nip between the rollers is ultimately incorporated into sheeting 1 without any significant change of position of the granular material 8. Consequently, the particles forming the contrastingly-colored granular material 8 can be fed in a manner capable of being arbitrarily determined in advance, and embedded into the sheeting 1 without significant change of their position. Hence, one can produce floor sheeting having imbedded patterns of granular material corresponding to virtually any predetermined pattern.

After emerging from the opening between the two rollers 6, the non-porous sheeting 1 can be passed beneath further sprinkling devices 10 and sprinkled with further contrastingly-colored particles 2 made of caoutchouc. Moreover, if a turn-around into a rearward position is provided, one may preferentially employ an additional rolling mill 11 by which any additionally sprinkled particles 2, which initially are only loosely sprinkled, are pressed into the sheeting 1. At this point the sheet will contain only unvulcanized caoutchouc, so that by pressing any loose particles against the sheeting, one obtains good adherence between the particles and the sheet so that a permanent adherence results. A corresponding pressure device can be omitted if a corresponding turning around of the sheeting is not provided for and a continuous vulcanizing machine 9 is used, as shown in FIG. 3. This consists primarily of a slowly running vulcanizing drum 12, against which, with the help of a steel band following the rotary motion of the vulcanizing drum, the sheeting to be vulcanized is pressed and simultaneously vulcanized. After leaving the vulcanizing drum, the ready-to-use floor covering is in final form and available for use. With the help of a cutter 14, tiles are generally cut off from the floor covering, stacked and supplied for use as directed. Alternatively, the finished product may be provided in the form of rolls to simplify its subsequent use.

Figure 4:
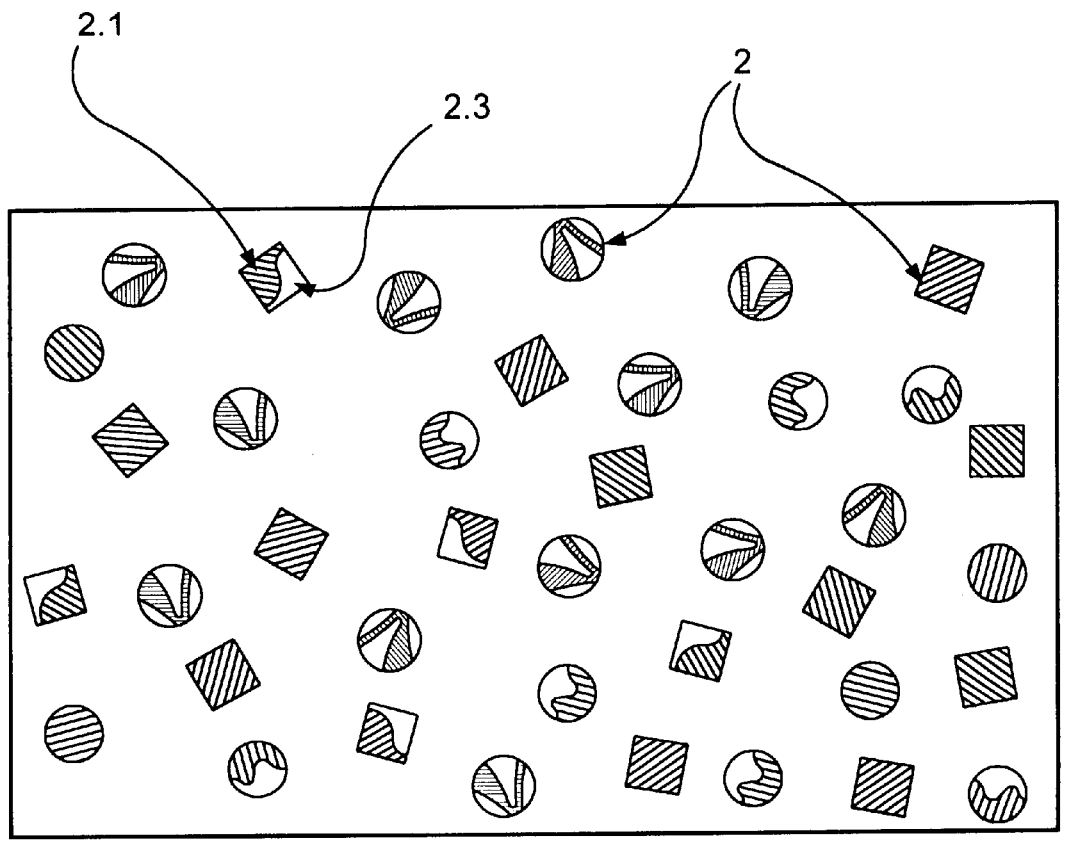
FIG. 4 shows a cut-away top plan view of a portion of a floor covering of the type constructed according principles of to the invention.

In FIG. 4, a sample of the floor covering is shown in top-plan view. This consists throughout of vulcanized rubber and includes contrastingly-colored particles 2 in an homogeneously dyed sheeting 1. The particles comprise at least two contrastingly-colored particle sections 2.1, 2.3. The particles 2 can be of arbitrarily selected cross-section.

Figure 5:
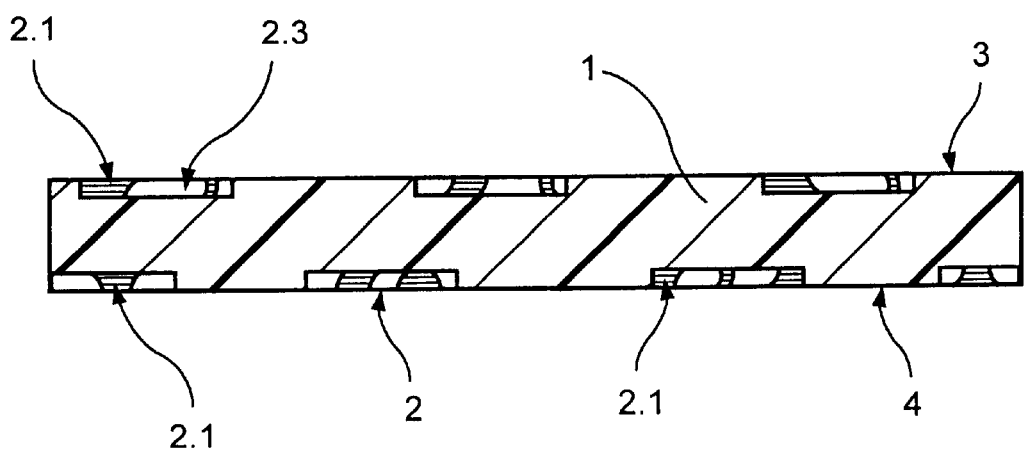
FIG. 5 provides a cross-sectional view of the floor covering depicted in FIG. 4.

FIG. 5 shows the floor covering according to FIG. 4 in a cross-section. It is shown clearly that the contrastingly-colored particles 2 in this variant are preferably arranged both in the area of the top side 3, as well as in the area of the bottom side 4 of the floor covering.

What is claimed is:

1. A method for manufacturing a multicolored, patterned floor covering, comprising the steps of:

dying a first granular material made of caoutchouc to a first, uniform color;

forming the first granular material into sheeting and introducing into the sheeting a second granular material made of caoutchouc comprising particles that contain at least two sub-regions that are dyed to colors that are different from each other and from the first color of the sheeting;

wherein the colors of the sheeting material and the colors employed in the embedded particles are such that for the amount of embedded particles used in the sheeting, an aggregate mixture of the sheeting and embedded particles has an over-all color that approximately equals the first color of the sheeting material.

2. The method according to claim 1, wherein the first granular material is introduced to form the sheeting by feeding it from above into an opening between two counter-rotating rollers turning around horizontal axes, and wherein this material is then mixed with a third granular material, which is then compressed so as to eliminate porosity, while avoiding a mutual intermixing of the color boundaries of the particles forming the granular materials.

3. The method according to claim 1, wherein the third granular material is fed to the first granular material from a site that is displaced from the opening between the rollers.

4. A method for manufacturing a floor covering, comprising the steps of:

provides a sheeting of caoutchouc that has a first color;

sprinkling a contrastingly-colored granular material of caoutchouc onto the sheeting of caoutchouc of the first color, wherein the granular material comprises particles having subregions that differ in color both from each other and from the sheeting;

pressing the granular material into the sheeting with a roll calender so that the particles are flush with the surface of the sheeting; and vulcanizing the sheeting and particles in a continuous manner with a continuous vulcanizing machine or a press at a temperature of 160° to 190° C., so as to set the added particles in a fixed position with respect to the sheet; wherein the colors of the sheeting material and the colors employed in the embedded particles are such that for the amount of embedded particles used in the sheeting, an aggregate mixture of the sheeting and embedded particles has an over-all color that approximately equals the first color of the sheeting material.

* * * * *